United States Patent [19]

Ghose et al.

[11] 3,882,541

[45] May 6, 1975

[54] ROTATING MEMORY ACCESSING MECHANISM

[75] Inventors: Sanjoy Ghose, Redwood Estates; Paul A. Gilovich, Saratoga, both of Calif.

[73] Assignee: IBM Corporation, Armonk, N.Y.

[22] Filed: Jan. 25, 1974

[21] Appl. No.: 436,454

[52] U.S. Cl. .................................... 360/78; 360/106

[51] Int. Cl. ................................................ G11b 5/52

[58] Field of Search .................. 360/61, 64, 106, 78

[56] References Cited

UNITED STATES PATENTS

| | | | |
|---|---|---|---|
| 3,314,057 | 4/1967 | Mogtader | 360/78 |
| 3,681,525 | 8/1972 | Weba et al | 360/97 |

*Primary Examiner*—Vincent Canney

*Attorney, Agent, or Firm*—Fraser and Bogucki

[57] ABSTRACT

A system for recording and reproducing data streams in continuous or segmented form on a rotating buffer memory comprises a pair of head accessing mechanisms that are alternately shifted from track to track in synchronism with the rotation of the disk, such that one head is always available for data transfer. The mechanism provides high speed, but stable, shifting between tracks, by a cam arrangement driven by a stepping motor and in turn controlling the head accessing mechanism. The cam comprises a low mass, low inertia disk having a peripheral cam surface with a periodic progression of alternating dwell and ramp portions spaced in accordance with the stepping motor increments. Flexural members urge support devices for the head mechanisms in a direction to maintain cam followers in engagement with the cam surface and insure precise head positioning while filtering out vibrations and eliminating resonances induced by the stepping motor and associated system.

25 Claims, 13 Drawing Figures

ROTATING MEMORY ACCESSING MECHANISM

BACKGROUND OF THE INVENTION

This invention relates to rotating buffer memory systems, and more particularly to systems for recording or reproducing data and mechanisms for high speed shifting of head accessing mechanisms from one track to another.

Modern data processing systems often utilize buffers, such as magnetic tape memories or rotating memories of the disk file type for effecting data transfer to or from a peripheral unit. A common example is that of the line printer, for which data is first prepared by a data processing system, and entered into a buffer which feeds data to the printer off-line at a slower rate, reading back segments of data to control successive lines of printing. And it is also known to record a data stream on one or more disk files operating on-line under central processor control, the head mechanisms being accessed to available tracks and a long sequence of data being transferred under central processor control.

This type of buffer application, involving initial recording and later reproduction of a data stream, is being increasingly found in modern systems, such as data communication and data printing systems. However, existing buffer systems are often considerably more expensive or complex than is desirable for particular applications.

A substantial but definable amount of data in digital form is often processed or transmitted to generate a page or other unit of graphical output record. In a data facsimile system, for example, a page of data may be transmitted with high resolution with a limit of about 10 million bits of binary informaiton. Where alphabetic as opposed to graphical or pictorial information is involved, the data stream may be augmented or reorganized to provide a desired format, which function requires data buffering. Whether or not format control is used buffering is almost universally required in such applications to compensate for different data rates or to permit interruption of recording or reproduction. Existing systems for on-line or off-line buffering are, however, generally too complex or expensive for such applications.

It has been proposed for such functions to utilize helical scan tracks on rotating disk memories, which function may be achieved in accordance with U.S. Pat. No. 3,757,030 or by utilizing a lead screw drive to control positioning of the head accessing mechanism on a continuous basis. This type of mechanism is, however, necessarily continuous and does not readily permit interruption of data transfer during input and output modes. it is also known in video systems to use track-to-track stepping, under control of a stepping motor, of a recording or playback head, with each track on the disk being devoted to individual fields or frames or multiples thereof, and with stepping being accomplished during blanking intervals or longer intervals in which a portion of the picture may be lost. However, modern disk files for data processing systems operate at higher speeds, have high track densities and are required to operate on a virtually error-free basis. In addition, there is no dead time interval within which track-to-track shifting can be effected. The characteristics of modern multi-pole stepping motors tend to limit their suitability for such sensitive applications. As the rotor of such a mechanism is impacted magnetically from one stable position to the next it undergoes uneven acceleration and deceleration forces which give rise to resonances, overshoot, and vibrations. Consequently, although the stepping time from one nominal position to the next may be relatively short, the settling time required for the driven element to become stable in its new position is considerably longer. The magnetic detenting effect in a stepping motor is also mechanically unstable due to inherent hysteresis characteristics. The step location varies from one position to the next even though the geometric reference of the motor poles remains constant.

SUMMARY OF THE INVENTION

Systems in accordance with the invention provide control of the track-to-track positioning of head access mechanisms for disk files by driving the access mechanisms from a stepping motor through low inertia cam means. Support devices for magnetic head arms are urged with forces of selected range against the cam means by flexural members. By utilizing at least two access mechanisms, operating alternately, an arrangement is provided such that one head can reccord or reproduce while the other is being shifted to the next adjacent track. With the heads alternating in shifting during successive disk revolutions, recording and reproduction can be continuous. Arrangements in accordance with the invention are unusually compact and economical and can be inherently synchronous with an associated scanning or printing system.

In a specific example of a system in accordance with the invention, a pair of access mechanisms, primarily arm assemblies and heads, are extended from a pair of carriages so as to be movable inwardly and outwardly on opposite sides of a disk file. In one arrangement, a single thin disk cam is rotated about an axis of rotation in equal increments by a stepping motor, in a plane substantially parallel to the axes of movement of the head access mechanisms. The peripheral surface of the cam includes an incrementally varying pattern of dwell and transition regions, the dwell regions being at different radii relative to the axis of rotation, with each different radius corresponding to a different track position for one of the head mechanisms. Each carriage is separately supported and biased in the direction toward the disk by planar flexural damping members. Cam followers coupled to the separate head support carriages are spaced apart by an odd number of incremental surfaces on the cam, so that for each step of the stepping motor one head mechanism is shifted between tracks while the other remains stationary at a given track. The flexural damping members preferably lie in planes substantially normal to the axes of movement of the head access mechanisms, and comprise laminated planar elements having both resilient and damping layers. A data stream is alternately switched betweeen head mechanisms, as each revolution is completed so that a data stream is continuously recorded, but on alternate tracks. Recording or reporduction may be interrupted, and data on an individual track may be segmented into sectors. The positioning control mechanism not only precisely controls track location, but also provides smooth acceleration and deceleration control between tracks regardless of vibration-introducing tendencies of the stepping motor.

In a different example, a separate cam is used for each of the head access mechanisms, but the cams are driven concurrently by a centrally disposed double-ended stepping motor.

In a still different example of a system in accordance with the invention, useful particularly where low head loading forces are involved, a pair of planar disk cams are mounted substantially parallel to the magnetic disk but spaced apart and rotated in increments by associated stepping motor. Small, light weight and low force flying head assemblies extend from the free end of separate pivot arms into operative engagement with the upper and lower surfaces of the disks. A cam follower mounted adjacent the free end of each of the pivot arms engages and follows the contour of the cam periphery under the urging of a flexed spring in engagement with a spaced apart region on the pivot arm. The pivot arm alone absorbs the loading forces acting on the head mechanism, and the spring need not employ damping means for the system to effectuate the desired filtering of the aberrations of the stepping mechanism.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
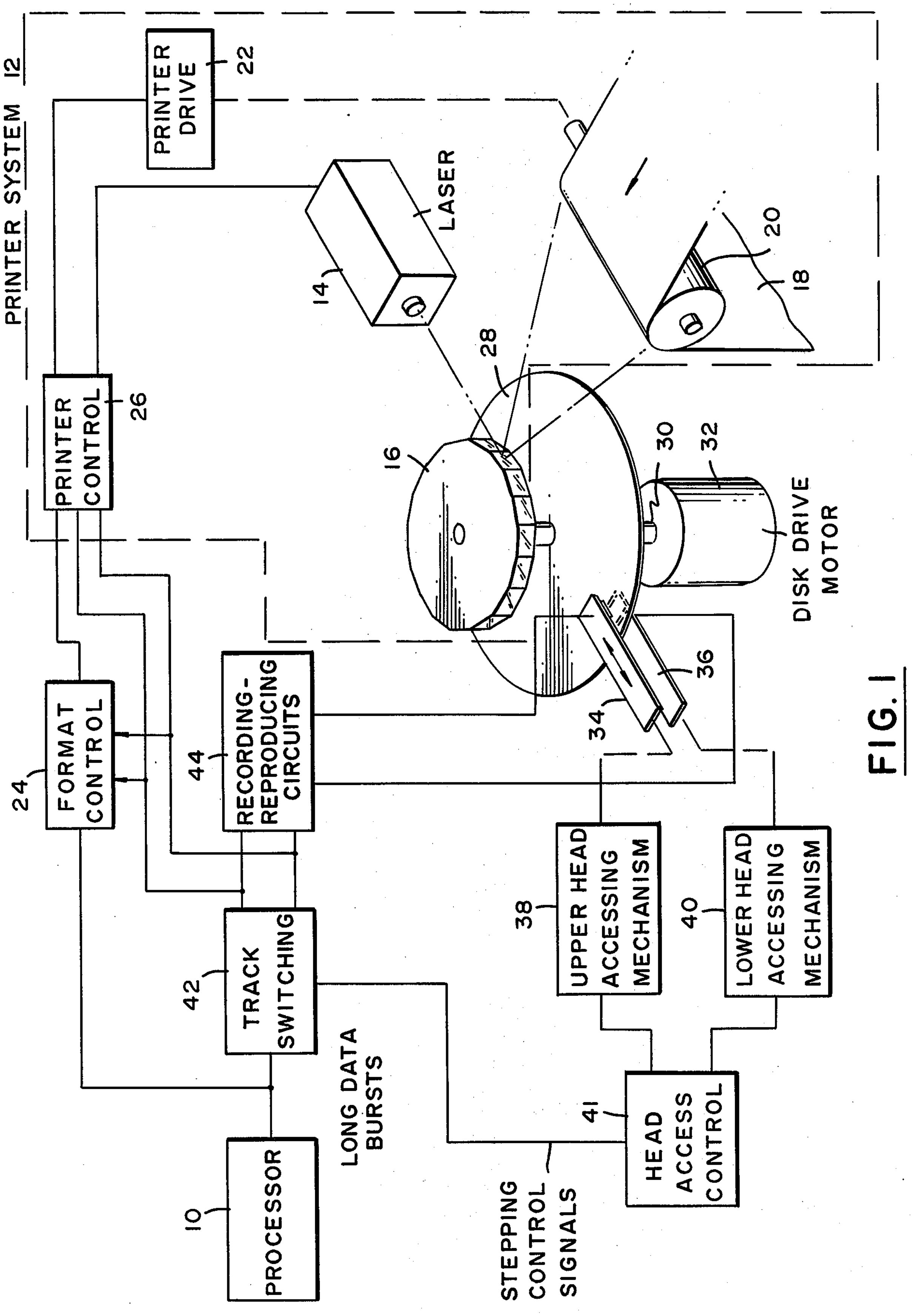
FIG. 1 is a combined block diagram and simplified perspective view of a system in accordance with the invention.

Systems in accordance with the invention may be used in a number of data buffer contexts, but particularly useful applications are found in output data record preparation, a particular example of which is shown in FIG. 1. FIG. 1 illustrates the principal subsystems, generically defined, utilized in a data facsimile application, in which data streams are received from a data processor 10 and corresponding printed matter is recorded by a printer system 12. In the printer system 12, a finely defined, modulated beam of high intensity light from a laser 14 is deflected off successive faces of a multi-faced high speed rotating mirror 16 as it rotates, to provide successive line scans across an output record, which may be a film, xerographic paper 18 or like medium. In this example the mirror 16 has 18 equal faces. A record advance drum 20 is advanced incrementally or continuously at a controlled rate of speed by a printer drive 22. The details of this system are not shown, inasmuch as they form no part of the invention and a wide variety of expedients may be used, including for example the optical system shown in U.S. Pat. No. 3,750,189 and entitled "Light Scanning and Printing System."

Similarly, details of the data processor 10 and associated subsystems for data handling have not been shown in order to simplify and clarify the invention, and because these units are optional and do not form part of the invention. The processor 10 may for example be a central processor unit, or a data transmission system providing long data bursts. If desired for a photocomposing application, data may be organized and arranged in a format control 24, although it will be recognized that this function may also be performed in a central processor unit. In a specific example of a system utilizing the invention, however, a data buffer system is required to receive data, corresponding to a single page ($10^7$ bits), at a high data rate (10 MHz), and store the data in the buffer system, so that the data may be reorganized by the format control 24 as desired. Reproduced data and format control signals are provided to a printer control 26 which generates the modulating signals for the laser 14 and an advance control signal for the printer drive 22, in synchronism with rotation of the mirror 16. The format control 24 and printer control 26 are not intended to disclose formatting functions which need not be described here, but merely indicate the manner in which the buffer system of the invention is actually utilized. However, systems in accordance with the invention may also be utilized in a traditional data facsimile system, in which a continuous sequence (e.g., a picture or page to be reproduced) is received as modulated picture information and later played back on a line-for-line basis without the rearrangement functions that may be effected in a format control.

In the data buffer system, a magnetic recording disk 28 is mounted on a common shaft 30 with the multi-faced mirror 16 in the printer system 12. A disk drive motor 32 directly drives both the disk 28 and the mirror 16, maintaining a synchronous relation between recorded data on the disk and the laser beam scan. Upper and lower flying head mechanisms 34, 36 respectively are each disposed in operative relation with the upper and lower surfaces, respectively, of the disk 28. These flying head mechanisms 34, 36 may be of conventional types, such as the arm, head and aerodynamic head pad mechanisms widely used in the IBM 3330 system. Each flying head assembly is positioned by a separate head accessing mechanism 38, 40 respectively operated by a head access control 41.

The data streams from the processor 10 are divided into shorter streams for separate recording by the alternate magnetic heads 34, 36 by track switching circuits 42 which concurrently provide a stepping control signal to the head access control 41. The track switching of data signals is here effected simply on a periodic basis, once for each disk revolution. Alternatively, however, switching of data signals may be interrupted, and when both heads 34, 36 are stationary, switching may be made responsive to synchronizing signals that denote the end of a line, or to separate instructions contained in the data bursts that are provided from the processor 10 for use in conjunction with format control. The alternately directed data signals are provided through separate recording/reproducing circuits 44 to the upper and lower magnetic head mechanisms 34, 36 respectively.

In the operation of the system of FIG. 1 for recording, the data stream from the processor 10 is divided into segments or bursts, each for a separate track, these segments being alternately recorded on single tracks on the upper and lower faces of the disk 28. The stepping control signal occurring at the end of each revolution is applied to the head access control 41, which alternately steps the upper and lower head accessing mechanisms 38, 40. Thus one magnetic head assembly remains stationary for recording on a given track while the other is moved to the next adjacent track in the time of one revolution. Then the succeeding segment of the data stream is transferred to the head that has just been accessed to the next track position, while the other head is shifted during this time interval. Recording is not only continuous, but is segmented in accordance with the separate faces on the mirror 16. The beam reflected off a given face sweeps a line on the output record, so that 18 lines are scanned in a single revolution of the disk 28. In the present example binary signals are recorded not to represent individual characters, but to define on-off laser beam states. The printer drive 22 slowly advances the paper 18 in synchronism with the line scan, to provide the equivalent of vertical deflection.

In reproducing the recorded data, the heads are again switched from track to track alternately, under control of the track switching circuits 42, so that one head is at each point in time providing signals through the recording/reproducing circuits 44 to control modulation of the laser 14. Eighteen data segments serially disposed on a given track are reproduced in synchronism with laser 14 beam scan directed off successive mirror 16 faces as the paper 18 advances. Thus the modulated beam from the laser 14 scans successive single lines in synchronism with disk 28 rotation so as to provide the desired facsimile print out. The format control 24 may be employed to appropriately dispose and rearrange the output data.

It will be seen that this system has both adaptability and versatility. Input data may be in a continuous page format or in interrupted segment form. Output data may similarly be interrupted or provided continuously. Tracks may be segmented if desired, in the sense that (under control of a conventional sector counter) an individual sector may be recorded or reproduced in isolated fashion.

Figure 2:
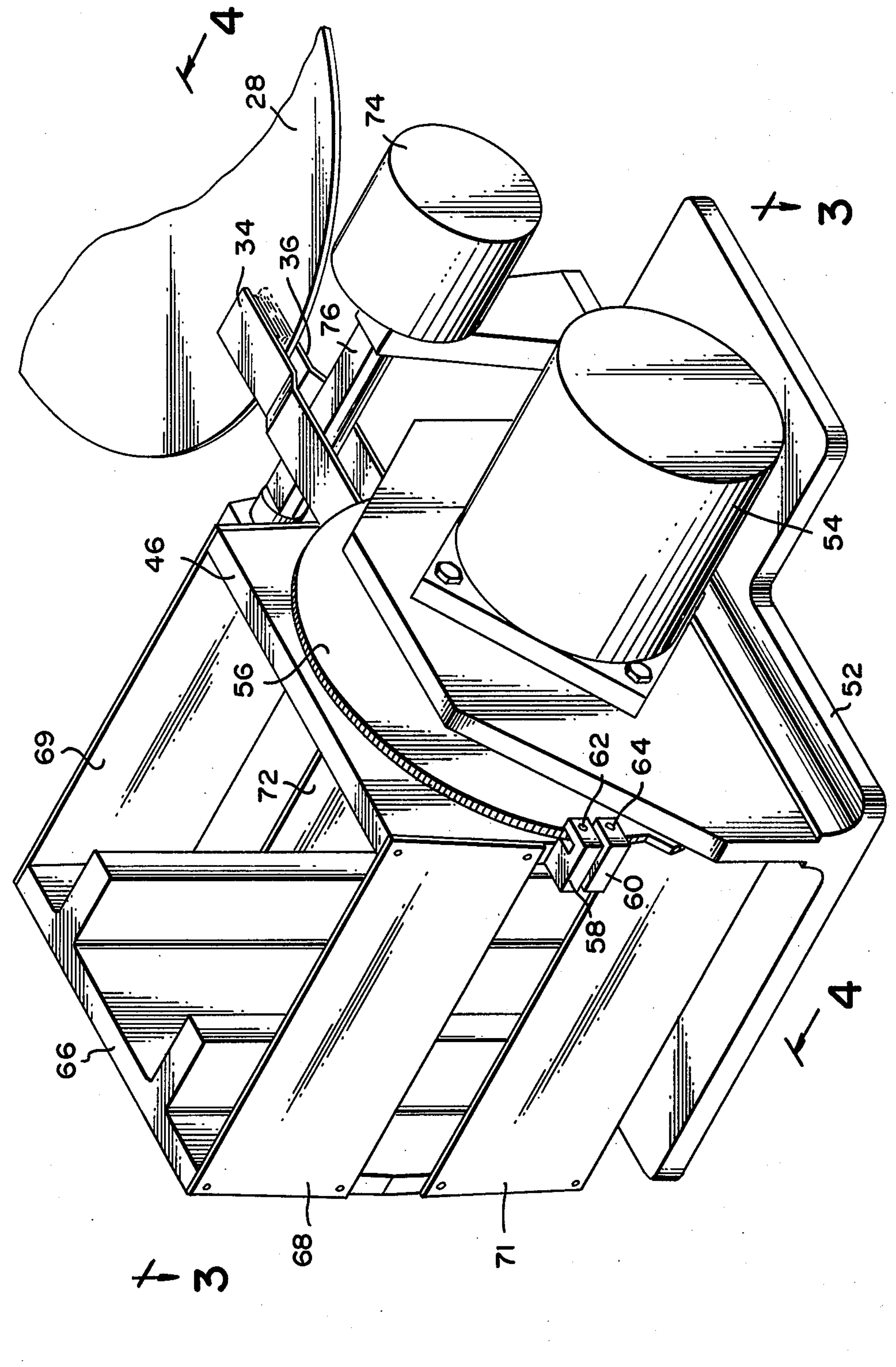
FIG. 2 is a broken-away perspective view of the head accessing mechanism portion of the system of FIG. 1.
Figure 3:
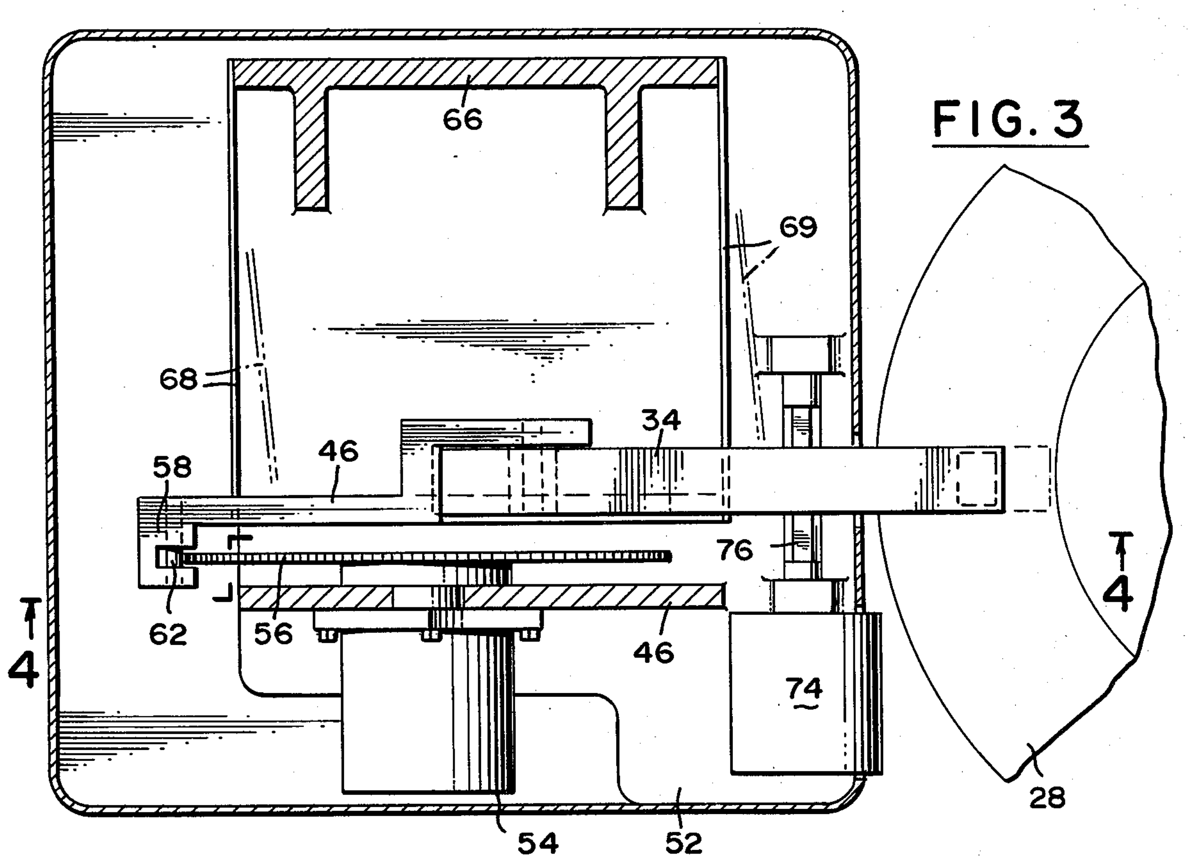
FIG. 3 is a top sectional view of the arrangement of FIG. 2, taken along the lines 3—3 therein.
Figure 4:
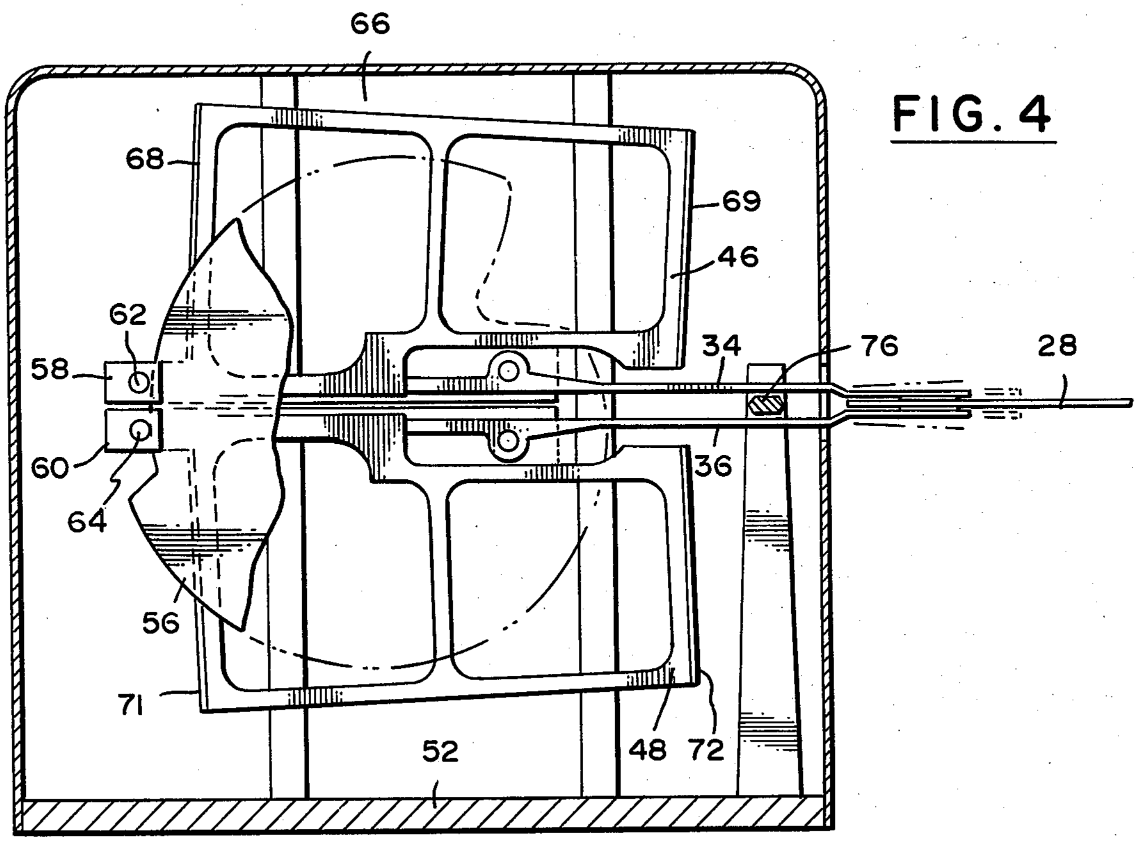
FIG. 4 is a side sectional view of the arrangement of FIG. 2 taken along the lines 4—4 therein.

FIGS. 2–4 illustrate a preferred arrangement of the upper and lower head accessing mechanisms 38, 40 relative to the head assemblies 34, 36. The head assemblies 34, 36 are mounted on opposite sides of the disk 28, along approximate radii relative to the central axis of rotation of the disk 28. The outer ends of the head assemblies 34, 36 relative to the disk 28 are affixed to upper and lower carriages 46, 48 suspended from a support structure 52. The carriages 46, 48 are also disposed to move longitudinally along the same axis as the upper and lower head assemblies 34, 36 respectively. A high speed stepping motor 54 is mounted on the support structure 52, with its shaft being disposed along an axis of rotation that is normal to the axes of movement of the head assemblies 34, 36, and between the carriages 46, 48. A single, low mass, low inertia thin planar cam 56 is mounted normal to the shaft of the stepping motor 54, with its outer periphery defining the operative cam contour. Upper and lower C-shaped brackets 58, 60 extend from the repective carriages 46, 48 on the outer side relative to the disk 28, each partially encompassing the periphery of the cam 56 in closely spaced relation. Upper and lower roller cam followers 62, 64 are rotatably mounted in the brackets 58, 60 respectively in a direction normal to the plane of the cam 56, each cam follower 62, 64 being transverse to and in engagement with the peripheral cam edge. The cam 56 has regular small incremental variations about its periphery, comprising alternating dwell and inclined or riser portions, with the successive dwell portions being at different radii, each corresponding to a different track position, and the inclined portions comprising transitions between the dwell portions.

The carriages 46, 48 are both suspended in a plane parallel to the disk and mechanically biased in the direction of the disk 28 by associated structural damping mechanisms. A stationary support bracket 66 coupled to the support structure 52 is spaced apart from the carriages 46, 48. For each carriage 46 or 48, a pair of laminated flexure paltes 68, 69 and 71, 72 extend from the fixed support bracket 66 to opposite ends of the respective carriage 46 or 48. For the upper slidable carriage 46, the laminated flexure plates 68, 69 are mounted on an upper portion of the support bracket 66 at their fixed ends, lying in nominal planes that are transverse and substantially normal to the axis of movement of the upper head assembly 34. The free ends of the plates 68, 69 are coupled to the opposite longitudinal ends of the carriage 46. The plates 71, 72 for the lower carriage 48 are similarly mounted at opposite ends to the carriage 48 and the support brackets 66. Both carriages 46, 48 and the associated head mechanisms are freely suspended on their associated flexure plates. The flexure plates 68, 69 and 71, 72 each comprise at least one resilient metal layer and a damping layer, so that when slightly bent away from their rest position they provide a spring force but without tendency to vibrate. Here the flexure plates 68, 69 and 71, 72 are bent to curve slightly away from the disk 28 axis and the cam followers 62, 64 and the associated carriages 46, 48 are urged in the inward direction relative to the disk 28. The spring force selected is in the range of 0.5 to 2.0 lbs., and has a resonance characteristic out of the frequency range of the system.

It will be noted that the suspended head assemblies 34, 36 move only approximately radially relative to the disk as they move inwardly or outwardly. Being suspended at the ends of the flexure plates 68, 69 or 71, 72, they shift slightly laterally relative to their principal longitudinal axis of movement. This does not impose either mechanical or electrical restraints, however. The contact area between the cam and the followers is very small and the cam followers readily shift in position. The magnetic heads shift slightly in angle relative to the record track, but are not skewed sufficiently to provide any discernible effect on signal-to-noise ratio or reliability.

Circuit connections to the magnetic heads on the head assemblies 34, 36 are made by conventional flexible circuit interconnections that are not shown in detail but do not impede the accessing function. For loading and unloading the head assemblies 34, 36 a single rotary actuator 74, which may be of the Ledex solenoid type with self-contained return spring, is mounted on the support structure 52 along the axis of a head loading cam 76 of eccentric cross-section that extends between the arms of the upper and lower head assemblies 34, 36. When the actuator 74 is energized, the head loading cam 76 is rotated to the loading position shown, in which the head assemblies 34 are permitted to move under their normal mechanical bias into all bearing relation with the disk 28. If power fails, or if the control signal terminates, de-energizing the actuator 74, the actuator 74 returns to rest position rotating the head loading cam 76 through an angle to bring wide part of the cam cross section in engagement with the head assemblies 34, 36, spreading them away from the disk 28. Signals for controlling the head loading actuator 74 may be provided under control of an operator or by a control system for the disk file in well known fashion.

The arrangement of FIGS. 2–4 provides an inexpensive but nevertheless highly reliable and stable system for head accessing to a buffer memory. With the head assemblies 34, 36 in air bearing relation to the disk, and with the disk rotating at a high speed (e.g., 8000 RPM) recording commences by coupling data signals to either of the head assemblies 34, 36. The placements of the cam followers 62, 64 relative to the dwell and riser portions on the cam 56 are selected such that for a given step of the stepping motor 54, one cam follower 62 or 64 moves solely through a dwell portion on the cam, while the other moves through a transition portion, shifting the associated head assembly 34 or 36 to the next track. The just-shifted head assembly then is in a dwell portion for the next step, while the previously stationary head is shifted. Consequently a single energizing signal to the stepping motor 54 is all that is required to alternate the movements of the head assemblies 34, 36. In the present state of the art, commercially available stepping motors step at rates from 300 steps per second to 800 steps per second without difficulty, particularly if the stepping rate can be relatively constant. Where the stepping rate is varied the motor or driven system often is resonant at some frequency range. Moreover, the acceleration and deceleration characteristics are not smooth, and there are tendencies not only to accelerate and decelerate in discontinuous fashion, but also to overshoot and vibrate. Thus if the head assemblies were directly driven from the stepping motor they might not rest predictably and precisely on the desired track positions, and excessive settling time would be needed before data recording and reporduction could commence.

These problems are obviated by the depicted cam and flexural driving system, in which high speed oscillations, vibrations and transients in the mechanical movement of the stepping motor are filtered out. The movement of each head assembly 34 or 36 from one track to another involves a smooth acceleration to a substantially constant speed movement, followed by a substantially smooth deceleration to the steady state position. The acceleration of a head access mechanism at any point in time is determined both by the stepping motor characteristics and the slope of the cam, so that a sudden acceleration increase at the stepping motor is translated into a relatively constant acceleration at the mechanism. The thin planar cam 56 is of low mass and inertia, which may be augmented by including internal apertures (not shown in FIG. 4). The flexure mechansims urge the respective carriages 46, 48 against the cam 56 with a selected range of spring forces for the desired span of head travel, and both flexure mechanisms and carriages are also of relatively low mass. An angular motion of the motor 54 is translated to a longitudinal movement of the carriage 46 or 48 by the cam 56 and follower 58 or 60, filtering out at least a part of vibrations and high frequency components. Any that remain are damped by the flexure mechanisms.

In a practical example of a system in accordance with the invention, track spacing is 0.005 inches or 200 tracks per inch, and track-to-track shifting time is substantially equal to one disk revolution, which is 8,000 RPM or 133.3 revolutions per second (7.5 milliseconds per revolution). With a bit density of 3,973 bits per inch, this system operates at a data rate of 9.7 M bits per second.

Figure 5:
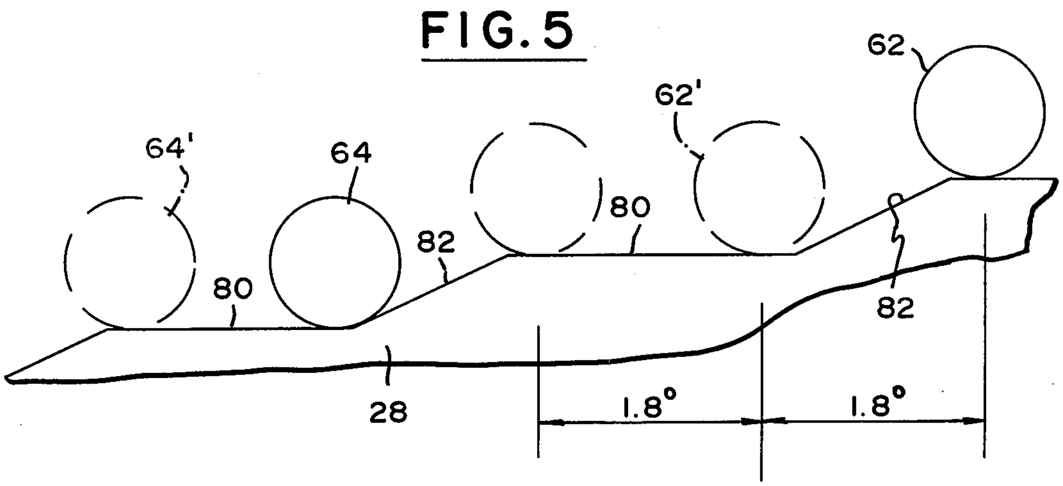
FIG. 5 is an enlarged plan view of a linearly extended segment of a cam utilized in the arrangement of FIGS. 2–4, showing the relative positions of cam followers thereon and the relative changes in position for successive steps.

The alternate displacement and shifting action of the upper and lower roller cam followers 62, 64 respectively during rotation of the cam 56 may be understood by reference to the enlarged fragmentary view of FIG. 5. For ease of depiction and understanding the small portion of the cam 56 has been shown projected out to linear form, although it will be appreciated that the dwell portions are actually arcs of a circle, with radii of curvature corresponding to the distance from the axis of rotation of the cam 56.

In FIG. 5, successive dwell portions 80 are separated by inclined or riser portions 82 on the peripheral edge of the cam 56. In order to provide the desired track density of 200 tracks per inch, the radial separation between successive dwell portions 80 is 0.005 inches. The stepping motor 54 of FIGS. 2–4 is selected to have 200 steps for each complete revolution, or 1.8° per step. The incremental step distance along the periphery of the cam 56 is denoted at successive points by demarcation lines. It will be noted that these demarcation lines, for the transition regions 82, commence prior to the termination of one dwell portion 80 and after the start of the next succeeding dwell portion 80. With the upper follower 62 starting at the end of a dwell portion 80, and with the cam rotated in the direction indicated, the upper follower 62 stays at the same radius when the cam 56 is stepped, then shifts along the incline 82 to the next adjacent radius, then stays at this radius until the cam movement stops, when it is at the position denoted 62'. The lower follower 64 starts from a position at the beginning of a dwell portion 80. When the cam 56 is rotated through its first step, the lower follower 64 moves along a dwell portion 80 and stays at the same radial position to end at the position denoted 64'. On the next step of the cam 56, however, the upper follower 62 holds position while the lower follower 64 shifts along a transition region. Thus a data stream, whether recorded or reproduced, can be switched without interruption from one head assembly to another, because both of the head mechanisms are stationary simultaneously for a time.

it will also be noted from FIG. 5 that the upper follower 62 and the lower follower 64 are separated by three increments of stepper motor rotation. This separation might also be effected with a greater or lesser number of odd increments, but in each instance an odd number of increments is to be used in order to alternate head shifting. It will be understood that the cam may be rotated in either direction and that virtually the entire peripheral edge of the cam may be utilized for the accessing function. In practice, however, the less than an inch of radius on the recording disk need be used, stepping control is effected by a 0.600 inch variation in the radius of a cam 56 whose maximum radius is only about 2 inches. A portion of the cam 56, as depicted in general form in FIG. 2, comprises an indented portion, which defines the head loading area of the disk. This area can either be at an inside or outside radius relative to the recording area, and need not in fact be used because it merely provides an extra safeguard.

Figure 6:
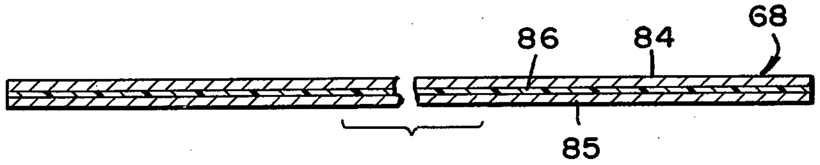
FIG. 6 is an enlarged, sectional view of a flexural damping mechanism used in the arrangement of FIGS. 2–4.

The planar flexure elements 68, 69, 71, 72 shown in FIGS. 2–4 may advantageously be constructed as shown in FIG. 6. These elements comprise a three layer laminate having outer layers of spring steel of approximately 0.007 inch thickness, and an intermediate layer of elastomeric adhesive of approximately 0.003 inch thickness. In this example, the elements are rectangular, of 3.75 inch in length and 1.50 inch in width. With the free ends of these elements mechanically supporting biasing the carriages in cantilever fashion, high frequency aberrations in the driven system are damped while the cam follower is held against and follows the cam contour. The principal plane of the elements lies substantially normal to the longitudinal axis of movement of the head mechanisms, so that the head mechanisms shift only in horizontal position. As the flexure elements change their curvature for different radial head positions relative to the disk, there is a slight lateral shifting of the heads (i.e. a slight circumferential change of position relative to the disk). This lateral shifting is no more than 20 mils in this example and as previously described presents no problem.

Figure 7:
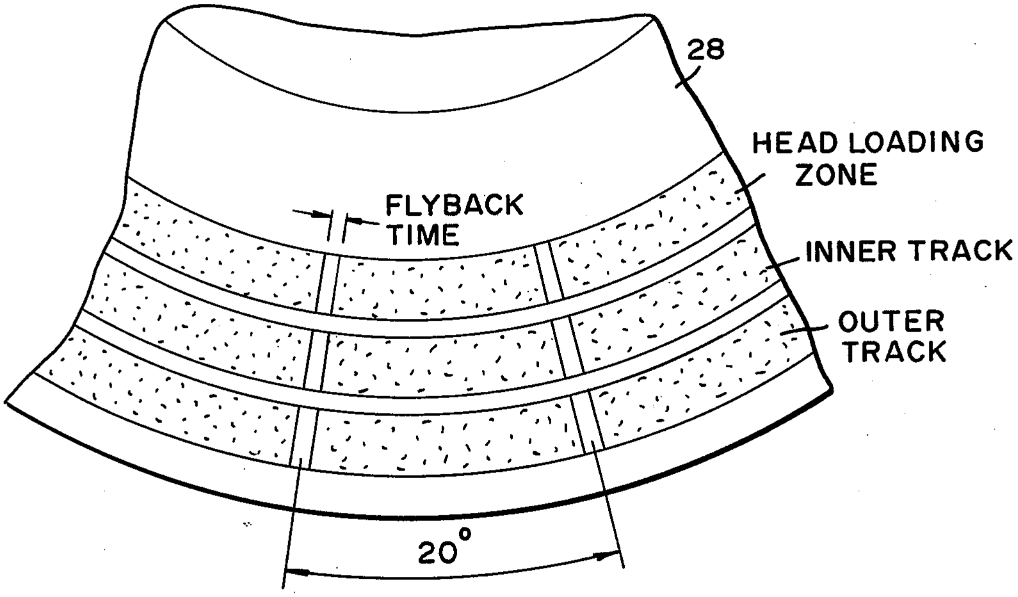
FIG. 7 is an idealized plan view of a portion of a disk used in the arrangement of FIGS. 2–4 showing the disposition of recording surfaces thereon.

The manner in which tracks are located relative to the disk 28 is shown in the plan view of FIG. 7. This represents three regions, including a head loading zone at an interior radial regions, including a head loading zone at an interior radial region, an inner recording/reproducing zone at an intermediate radial region, and another recording/reproducing zone at an outer radial region. Each of the inner and outer recording/reproducing zones has 60 tracks at 0.005 inch spacing. The recording/reproducing regions are divided into successive 20° sectors, with short gap segments denoted by cross hatched lines being utilized for flyback timing in the associated optical printout system. Referring again to FIG. 1, with 18 faces on the rotating mirror 16, one line of print data may be scanned out as each facet of the mirror causes scanning of the printing record member.

Figure 9:
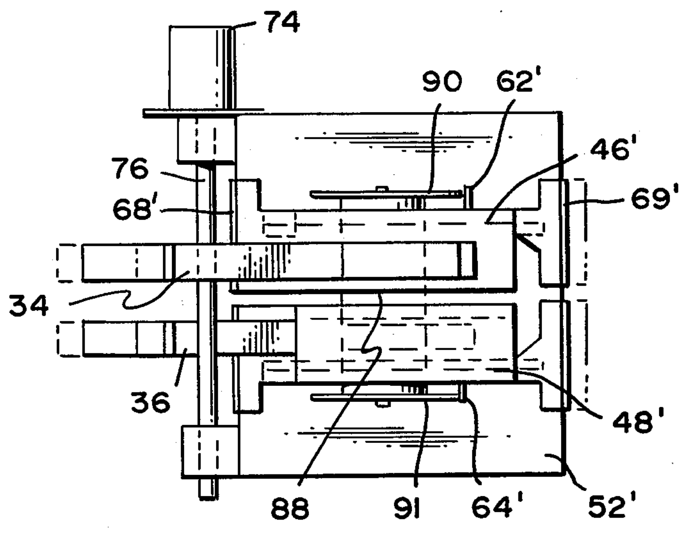
FIG. 9 is a different perspective view of a portion of the arrangement of FIG. 8, showing further details thereof.
Figure 8:
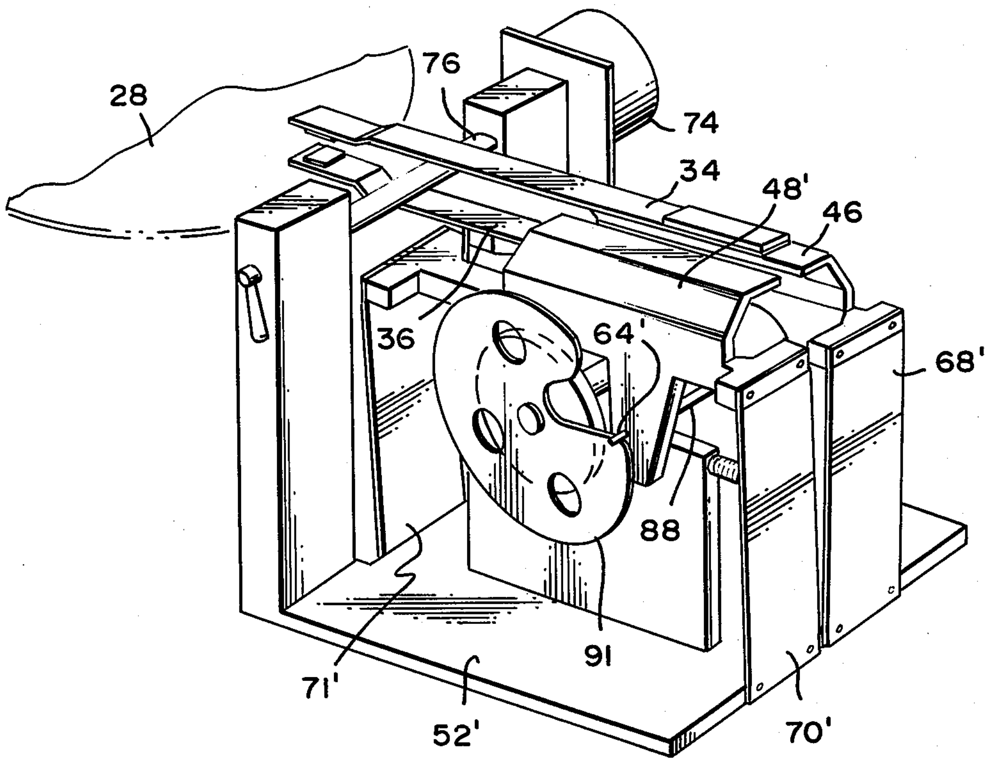
FIG. 8 is a broken-away perspective view of an arrangement in accordance with the invention using a pair of cams and a flexure mechansim disposed differently than the arrangement of FIGS. 2–4.
Figure 10:
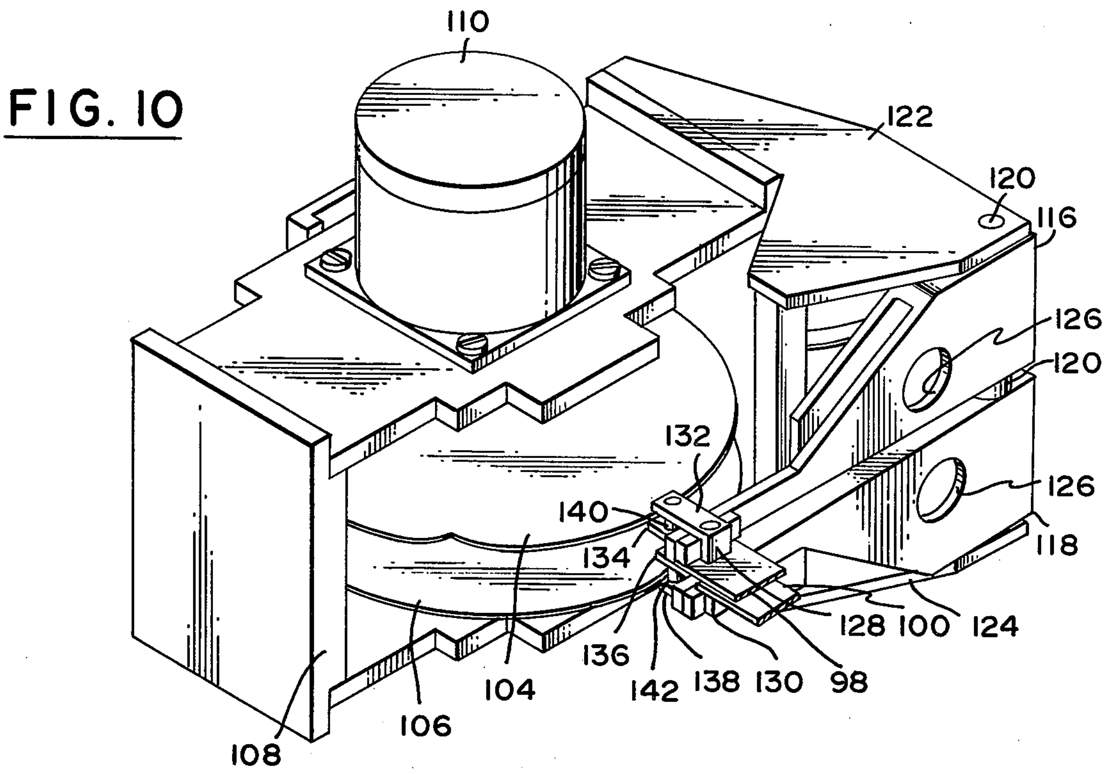
FIG. 10 is a perspective view of a different arrangement in accordance with the invention, utillizing a pair of pivot arms in conjunction with a piar of cam disks to control track-to-track positioning of a pair of head mechanisms.
Figure 11:
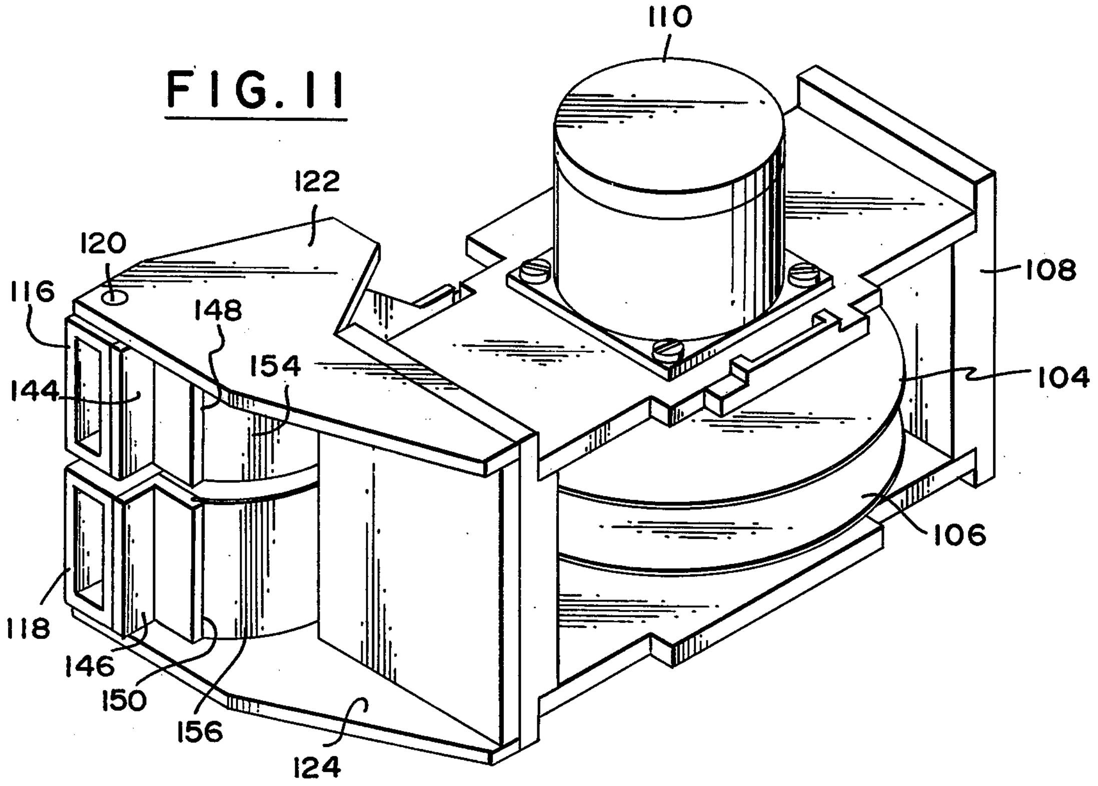
FIG. 11 is a different perspective view of the arrangement of FIG. 10.
Figure 12:
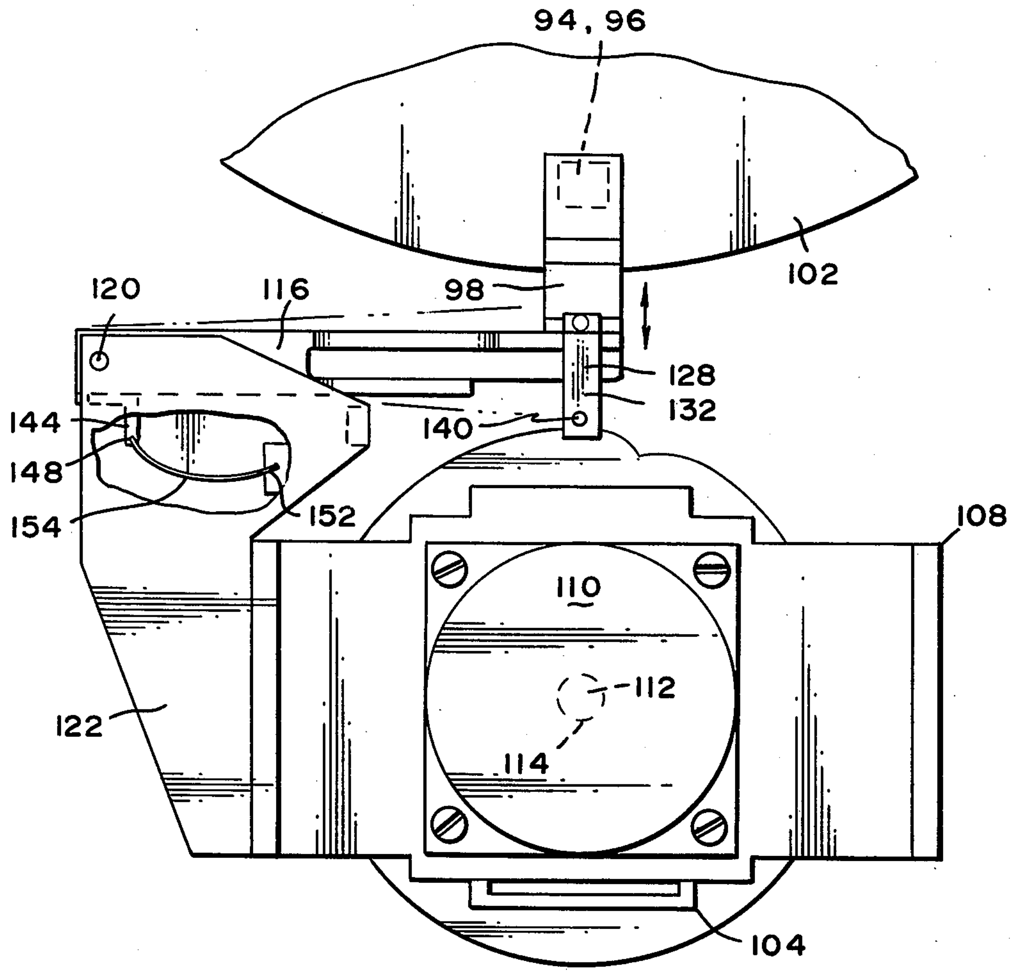
FIG. 12 is a generalized schematic view of the arrangement of FIGS. 10 and 11, showing the manner of use in relation to a magnetic disk file.
Figure 13:
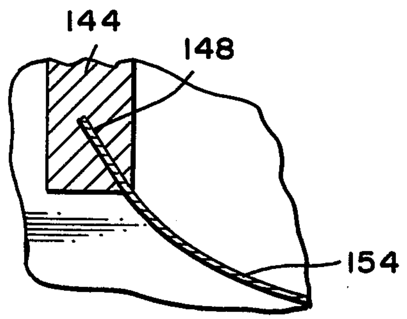
FIG. 13 is a perspective broken away view of the pivot arm and spring assembly employed in the arrangement of FIGS. 10–12.

FIGS. 8 and 9 depict two different views of an alternative arrangement in accordance with the invention. In these views, elements corresponding to those in the arrangement of FIGS. 2–4 are either similarly numbered or, where differing only slightly, are designated by primes ('). The head mechanisms 34, 36, head loading eccentric cam 76, and relationship to the disk 28 are all as previously described in conjunction with FIGS. 2–4 except that the head mechanisms 34, 36 are laterally displaced. Unlike the single cam version there described, however, a double ended stepping motor 88 is mounted on a centrally disposed region of the support structure 52', and first and second planar disk cams 90, 91 are each coupled to a different end shaft of the stepping motor 88. The carriages 46', 48' coupled to the upper and lower head mechanisms 34, 36 respectively are supported and mechanically biased radially relative to the disk 28 by separate pairs 68', 69' and 70', 71' of flexure plates disposed substantially normal to the plane of the disk 28. The flexure mechanism for example comprises first and second plate 68', 69' each substantially vertically disposed, and coupled at its lower terminus to fixed portion of the support structure 52', and at its upper terminus to a different longitudinal end of the carriage 46'. As previously described in conjunction with FIGS. 2–4, the plane of each of these flexure plates 68', 69', is substantially normal to the longitudinal axis of movement of the associated head mechanism 34. The flexure plates 70', 71' for the lower head mechanism 36 are correspondingly mounted.

In this arrangement, track-to-track shifting is as previously described, but each head mechanism is controlled by its separate cam. However, as the flexure plates, e.g. 68' and 69' shift in position they introduce a very small change in the spacing of the arm of the associated head mechanism 34 relative to the disk 28. This small change is automatically compensated by the spring elements of the head mechanism 34, which cause the head pad to continue to "fly" at the proper spacing from the disk 28.

The peripheral cam pattern on each of the separate cams 90, 91 may correspond to that of FIG. 6, or may be varied if desired to provide different track-to-track spacing or head loading zones, or different directions of head movement. In this example the peripheries of the cams 90, 91 are alike and similarly disposed and the cam followers 62', 64' are displaced by an odd number of peripheral increments in order to achieve the desired alternation of shifting from track to track. The cams, e.g. cam 91, here include apertures for reduction of mass and inertia.

A different system in accordance with the invention for advantageously controlling much lighter and smaller head arm assemblies is depicted in FIGS. 10–13, to which reference is now made. In this system, compact and lightweight magnetic heads 94 and 96 of the type utilized in the "Winchester" disk file are mounted on compact head arm assemblies 98 and 100 on opposite sides of a magnetic disk 102 arranged and driven in the same fashion as previously described. Again, a stepping motor, cam and spring loaded cam follower arrangement are used but the geometry and mechanism are substantially different.

The Winchester type flying head assembly is substantially smaller than the IBM 3330 type head and "flies" very much closer to the disk surface, the air bearing force being only of the order of one ounce. This much smaller head loading and the smaller mass and inertia of the head and the arm are utilized to advantage in a considerably more compact system geometry which has different functional characteristics but nonetheless provides the desired track-to-track stepping characteristic that may be synchronized to the rotation of the disk. In this arrangement, a pair of cams 104 and 106 are used, spaced apart along a common axis normal to the plane of the magnetic disk 102, so that the thin planar cams 104 and 106 are parallel to the plane of the disk 102. A fixed housing 108 forms an open frame about the cams 104 and 106, and a single stepping motor 110 mounted on top of the housing 108 has a shaft 112 extending through and supporting the cams 104 and 106 and journaled at its lower end in a bearing 114 in the lower portion of the fixed housing 108. A pair of pivotable arms 116 and 118 lie approximately tangential to the magnetic disk 102 and serve as the supports for the upper and lower head arms 98 and 100.

The pivot arms 116 and 118 comprise open interior channel sections that have a hollow rectangular cross section at the pivot axis, upper and lower arms being disposed along and couled to but separately rotatable on a single pivot shaft 120 rotatably mounted at its upper and lower ends in brackets 122 and 124 fixed to the fixed housing 108. For lightness of weight but suitable rigidity, the pivot arms 116 and 118 comprise a three-sided intermediate length of tapering depth and an elongated terminal portion having a shallow C-shaped configuration. A plurality of apertures 126 in the walls of the pivot arms 116 and 118 suitably lighten the mass without sacrificing the desirable rigidity of the structure. Small brackets 128 and 130 are mounted at the free ends of the pivot arms 116 and 118, and include upper and lower tabs 132, 134 and 136, 138 in which are seated rotatable cam followers 140 and 142 having their lengths parallel to the shaft 112 of the stepping motor 110, and with the tabs 132, 134, 136 and 138 lying substantially radial to the adjacent cam. The head arm assemblies 98 and 100 are mounted on the brackets 128 and 130, facing in the opposite direction from the tabs 132, 134, 136 and 138 toward the associated disk surface, with the wires therefor being extended along the interior portion of the hollow pivot arms 116 and 118.

Adjacent the pivotable axis of the pivot arms 116 and 118, L-shaped members 144 and 146 are affixed that include longitudinal slots 148 and 150 lying substantially parallel to the pivot axis. Along a substantially parallel but spaced apart region of the fixed frame 108 is included a corresponding slot 152. Single layer elements 154 and 156 of spring material are fitted into these opposed slots 148, 150 and 152, each longitudinal opposed end of a spring element 154, 156 being seated within a corresponding slot 148, 150, 152 and maintained in position by its own spring force, with the spring element being arcuate as shown. The length of the spring and the degree of curvature, as well as the spring force are selected to provide approximately one to two pounds of force across the entire extent of travel of the associated magnetic head, here about 0.60 inch viewed in plan view. A clockwise force is needed to maintain the cam follower 140, 142 against its associated cam 104, 106, and this clockwise force is supplied against the opposite end of the pivot arm 116, 118 by the spring 154, 156.

A head loading mechanism is not shown in these figures, and as previously described a head loading mechanism may or may not be used but if used would be of conventional form.

The arrangement of FIGS. 10–13 does not use the cantilevered flexure mechanism for support of the head arm assembly as in the prior examples, nor is a dampening component employed in the flexural system. Instead, the head loading force or air-bearing pressure is absorbed by the pivot arm 116, 118 and the shaft 120 about which it rotates. The pivot arm and associated mechanism are rigid enough to insure that the very small head-to-disk spacing is precisely maintained. In addition, the spring force acting close to the pivot axis is sufficient of itself to cause the cam follower to track the cam during each stepping motor movement. Again, the translation of motion effected by the profile of the cam effectively filters out stepping motor vibrations. This action is apparently enhanced sufficiently by the mass of the pivot arm and the mechanical multiplication gained by the length of the pivot arm as opposed to the length of the arm in which the spring force is exerted to provide further averaging of high frequency of vibrations and effects, while continuing to properly track the profile of the cam with the cam follower.

In addition, the arrangement is particularly compact and readily disposed and utilized in conjunction with a disk file.

It should be noted with respect to the action of the springs 154, 156 against the pivot arms 116, 118, that the spring force exerted is in a given range, such that for the different radial positions of the pivot arms relative to the cam disks 104, 106 there is a given force, in the range of one to two pounds, urging the cam followers 140, 142 against the associated periphery of the cam disks. The magnetic heads 94, 96 thus follow an arc of movement relative to the plane of the magnetic disk 102, as defined by the length of the pivot arm. However, the pivot arm is quite long, being in excess of several inches, and there is no significant change in the angle of the head and no deleterious effects on the recording or reproducing are observed. The change in head angle relative to the track is 2°–3° at most across the 0.60 inch of travel that is employed in this example. As previously discussed, the changes in radial position relative to the disk as the head moves from track to track are also small but in any event are immaterial inasmuch as they constant for any given track.

While various modifications and variations have been described or suggested above, it will be appreciated that the invention is defined only by the appended claims and encompasses all forms and constructions within the scope of the claims.

What is claimed is:

1. A disk file accessing system for advancing a magnetic head assembly to successive tracks comprising:

a head assembly support device coupled to said magnetic head assembly for movement substantially along a selected axis;

cam follower means coupled to said support device;

cam means having a peripheral cam surface adjacent said cam follower defining circumferential increments at varying radii from a selected axis of rotation;

motor means coupled to rotate said cam means about said axis of rotation in incremental movements corresponding to the circumferential increments;

and flexural means coupled to and supporting said support device and disposed to mechanically bias said cam follower means into engagement with the peripheral cam surface of said cam means.

2. The invention as set forth in claim 1 above, wherein the cam means comprises a low mass, low inertia disk and the peripheral cam surface comprises a progression of regularly varying alternating dwell and transition portions, the dwell portions lying at different radii from the axis of rotation.

3. The invention as set forth in claim 1 above, wherein said flexural means comprises at least two substantially like laminated planar flexure elements, each of which has a principal plane substantially normal to the selected axis, said elements being spaced apart along the selected axis and each having one end coupled to said support device and the other end coupled to the head assembly support device at a region substantially along the selected axis, such that for different curvatures of the flexure elements the head assembly is maintained in a plane substantially parallel to the disk and moved substantially along the selected axis.

4. The invention as set forth in claim 3 above, wherein said flexural means comprises a pair of laminated flexural members, each coupled to a different end of said head assembly support device, and each comprising at least two resilient layers and at least one elastomeric damping layer therebetween.

5. The invention as set forth in claim 4 above, wherein said laminated flexural members are each rectangular in their principal plane, and are disposed to urge said cam follower means against said cam means through a selected distance with a force between 0.5 and 2.0 lbs.

6. The invention as set forth in claim 1 above, wherein said flexural means comprises an elongated element mounted at one end thereof for pivoting movement about an axis and having the support device mounted thereon adjacent the other end thereof, and spring means coupled to the elongated element and biasing the elongated element relative to the pivot axis.

7. A system for moving a magnetic head assembly relative to a rotary magnetic member comprising:

carriage means capable of undergoing linear motion relative to the rotary member along an axis of motion and coupled to support the magnetic head assembly in operative relation thereto;

rotatable cam means rotatable about an axis of rotation adjacent the axis of motion of the carriage means, the rotatable cam means engaging the carriage means and including position defining cam surfaces thereon establishing different head positions relative to said rotary magnetic member;

and flexure means supporting said carriage means for movement relative to the rotary member and disposed to exert force against said carriage means in a direction tending to maintain said carriage means and cam means in engagement during rotation of said cam means.

8. A system for moving a magnetic head assembly relative to a rotary magnetic member comprising:

carriage means movable relative to the rotary member and coupled to support the magnetic head assembly in operative relation thereto;

rotatable cam means engaging the carriage means and including position defining cam surfaces thereon establishing different head positions relative to said rotary magnetic member, said cam surfaces defining a progression of alternating dwell and transition portions at regular increments;

flexure means supporting said carriage means for movement relative to the rotary member and disposed to exert force against said carriage means in a direction tending to maintain said carriage means and cam means in engagement during rotation of said cam means, said flexure means comprising at least a pair of damped planar flexure members each having one end coupled to said carriage means and the other end fixed and spaced apart from said carriage means; and means for incrementally rotating said cam means in increments corresponding to the cam surface variations thereon.

9. A system for moving a magnetic head assembly from track to track relative to a magnetic disk comprising:

carriage means movable substantially along a selected axis relative to the disk and coupled to support the magnetic head assembly in operative relation thereto;

at least one cam disk rotatable in a plane parallel to the selected axis and including a circumferentially varying incremental pattern at a periphery thereof, different peripheral increments thereon corresponding to different desired track positions;

incremental stepping motor means coupled to said cam disk for rotating said cam disk in increments corresponding to those of the incremental pattern;

cam follower means coupled to said carriage means and disposed along a selected radius adjacent the periphery of said cam disk and in engagement with said cam disk on a side away from the magnetic disk;

and planar flexure means including resonance damping means and lying substantially normal to the plane of said cam disk, said planar flexure means supporting said carriage means for movement along the selected axis and being under flexure to maintain said cam follower means against said cam disk during rotation thereof, whereby stepping motor vibrations are minimized in movement of the magnetic head assembly.

10. The invention as set forth in claim 9 above, wherein the peripheral incremental pattern of said cam disk comprises a progression of alternating dwell and inclined transition portions, each dwell portion corresponding to a different radial track position of the head relative to the disk, and each inclined portion defining a transition between adjacent tracks, said cam disk comprising a thin low mass, low inertia disk and said planar flexure means comprising a pair of spaced apart laminates including resilient and damping layers mechanically biasing said cam follower means against said cam disk with forces lying in a selected force range for a given extent of travel of the head assembly.

11. In a rotating disk file having a pair of magnetic head accessing mechanisms disposed to move along substantially parallel axes to different data tracks on the disk, a mechanism for alternately shifting the head mechanisms to successive tracks comprising:

a pair of carriage means movable along the respective axes and each coupled to and supporting a different head mechanism;

a pair of flexure mechanisms each separately supporting and biasing the individual carriage means;
cam follower means mounted on and extending from each of the carriage means;
stepping motor means;
and cam means coupled to said stepping motor means and engaging each of said cam follower means, said cam means including cam surfaces in engagement with each of said cam follower means, said cam surfaces being configured to alternately step said cam follower means and associated carriage means for each step of said stepping motor means.

12. The invention as set forth in claim 11 above, wherein the flexure mechanisms each comprise a pair of laminated plates having both resilient and damping layers, each pair of plates lying in spaced apart parallel relation and having one end fixed at a region spaced from the associated carriage means and the other end coupled to the carriage means.

13. The invention as set forth in claim 12 above, wherein said cam means comprises at least one flat disk means having a peripheral cam surface with an incremental varying pattern of dwell and transition surfaces, the incremental circumferential spacing of said surfaces corresponding to the steps of a stepping motor means and the dwell surfaces being at different radii relative to the axis of rotation of said cam means.

14. The invention as set forth in claim 13 above, wherein the cam means comprises a single cam engaging both cam followers, said cam followers being spaced apart relative to the cam by an odd number of cam stepping surfaces and wherein the flexure plates have a flexural curvature relative to a fixed base axis that is normal to the plane of the disk, such that the head assemblies move in a plane parallel to the disk as the plates flex.

15. The invention as set forth in claim 13 above, wherein the cam means comprises a pair of cams having successive dwell and transition surfaces corresponding to the stepping distance of said stepping motor means, one cam follower means being positioned to move along a flat portion while the other moves along a transition portion, and wherein the flexure plates have a flexural curvature relative to a fixed base axis that is parallel to the plane of the disk such that the head assemblies move parallel to a fixed axis as the plates flex.

16. The invention as set forth in claim 11 above, wherein the said head accessing mechanisms are disposed on opposite sides of the disk, wherein said head accessing mechansims include head arms extending from said carriage means for tending to maintain the magnetic heads therein in air bearing relation to the disks, and wherein said system further includes head loading cam means disposed between said head accessing mechanisms for moving said head accessing mechanisms away from the disk, to disengage the heads from air bearing relation to the disk.

17. A disk file system for providng substantially continuous read/write functions for a data stream comprising:
a magnetic disk rotating about a central axis at a selected rate;
a pair of magnetic head assemblies disposed in operative relation with different recording surfaces of said magnetic disk;
means for shifting said magnetic head assemblies from track to track in operative relation to the associated recording surfaces of the said magnetic disk, said means operating to shift the magnetic head assemblies alternately during successive revolutions of said magnetic disk and including a pair of carriage means supporting the magnetic head assemblies, rotatable cam means engaging the carriage means and having an outer periphery comprising different segments having different radial distances from an axis of rotation of the cam means, motor means coupled to rotate said cam means about the axis of rotation in incremental movements corresponding to the different segments, and means for mechanically biasing the carriage means into engagement with the outer periphery of the cam means;
switching means coupled to provide data paths alternately to said magnetic head assemblies;
and means for controlling said switching means in synchronism with the shifting of position of said magnetic head assemblies.

18. A disk file system for providing substantially continuous read or write functions comprising:
a magnetic disk rotating about a central axis;
a pair of parallel magnetic head assemblies extending substantially along given radii of said disk but on opposite sides thereof;
a pair of carriage means each movable substantially parallel to the given radii and each coupled to provide a cantilever support base for a different one of said magnetic head assemblies;
a pair of cam followers, each mounted on a different one of said carriage means and each extending normal to the given radii;
stepping motor means having an axis of rotation parallel to said cam followers;
cam means coupled to said stepping motor means and rotating therewith about an axis of rotation, said cam means having at least one peripheral cam surface engaging said cam followers and having an incrementally varying cam surface for alternately shifting said head assemblies by incremental amounts along the given radii for each step of said stepping motor;
signal switching means in circuit with both of said magnetic assemblies for alternately coupling each of said magnetic head assemblies on a common data path in synchronism with the rotation of said disk and with the stepping of said head assemblies;
and means responsive to the rotaiton of said disk for stepping said head assemblies alternately for each rotation of said disk.

19. A system for advancing a magnetic head assembly from track to track relative to a recording member comprising:
a pivot arm rotatable about a selected axis normal to the plane of movement desired for the head assembly;
a planar cam disk mounted in a plane parallel to the desired plane of movement and adjacent the pivot arm;
cam follower means mounted adjacent the free end of the pivot arm and in engagement with the periphery of the cam disk, the cam disk periphery having incrementally spaced surfaces at different radii from an axis of rotation of define separate head assembly track positions;

stepping motor means including a shaft driving the cam disk about the axis of rotation in increments corresponding to the peripheral increments;

and spring means engaging said pivot arm and tending to maintain the cam follower in engagement with the cam disk periphery.

20. The invention as set forth in claim 19 above, wherein the spring means comprises an arcuate spring element having one end engaging said pivot arm and the other end being fixed.

21. The invention as set forth in claim 19 above, further including:

a frame adjacent said cam disk and supporting said stepping motor;

a member mounted on said frame for receiving the free end of said spring means;

and a bracket mounted on the pivot arm for receiving the associated end of said spring means.

22. The invention as set forth in claim 21 above, wherein said frame and said bracket include slots for receiving the associated end of the spring means in disengageable relation.

23. A system for supporting and maintaining a pair of magnetic head mechanisms in air-bearing relation to a rotating magnetic disk disposed in a given plane and comprising:

a frame mechanism having upper and lower spaced apart portions for disposition adjacent a magnetic disk;

a pair of planar cam disks disposed in planes substantially parallel to the magnetic disk and spaced apart proximate the frame mechanism between the upper and lower portions thereof, the cam disks each including a circumferential pattern of alternating dwell and transition portions, the dwell portions being at different radii from the axis of rotatioon of the disk in a progressive pattern, each radii defining a different track position on the magnetic disk;

stepping motor means mounted on the upper portion of the frame mechanism and including a shaft extending between the upper and lower portions and engaged to drive said spaced apart cam disks, and including bearing means disposed in the lower portion of the frame mechanism for supporting the terminal portion of the stepping motor shaft, the stepping motor providing increments of motion corresponding to the incremental distance along the cam periphery;

pivot shaft means mounted in said frame mechanism at a point spaced apart from said magnetic disk and substantially normal to the plane thereof;

upper and lower pivot arms pivotally rotatable about said pivot shaft means and supported thereby, the free ends of said pivot arms extending adjacent said first and second cam disks respectively;

head assemblies mounted on said pivot arms adjacent the free ends thereof and extending in cooperative relation with the upper and lower surfaces of said magnetic disk respectively;

cam follower means rotatably mounted adjacent the free ends of said upper and lower pivot arms respectively and each engaging a different one of said planar disks;

and a pair of spring means, each having one end engaging said housing means in fixed relation and the other end engaging a different one of said pivot arms and urging said pivot arms in a direction of rotation to maintain the cam followers thereon in engagement with the periphery of the associated cam disk.

24. The invention as set forth in claim 23 above, wherein said spring means urge said cam followers against said cam disks with a selected range of spring force through the extent of radial movement defined by the radial variations of said cam disks.

25. A disk file accessing system for advancing a magnetic head assembly to successive tracks of a record member comprising:

head assembly mounting means capable of undergoing movement relative to the successive tracks of the record member;

cam follower means coupled to the head assembly mounting means;

rotatable cam means having an outer periphery in engagement with the cam follower means, the outer periphery comprising different segments having different radial distances from an axis of rotation of the cam means;

means coupled to rotatably drive the cam means; and means for normally biasing the head assembly mounting means to maintain engagement of the cam follower means with the cam means.

* * * * *

UNITED STATES PATENT OFFICE

CERTIFICATE OF CORRECTION

PATENT NO. : 3,882,541

DATED : May 6, 1975

INVENTOR(S) : Sanjoy Ghose et al

It is certified that error appears in the above-identified patent and that said Letters Patent are hereby corrected as shown below:

Column 17, line 1, "of" (second occurrence) should read --to--; lines 38 and 39, "rotatioon" should read --rotation--.

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*